(No Model.)
J. B. HURD.
HOEING MACHINE.
No. 373,022. Patented Nov. 8, 1887.
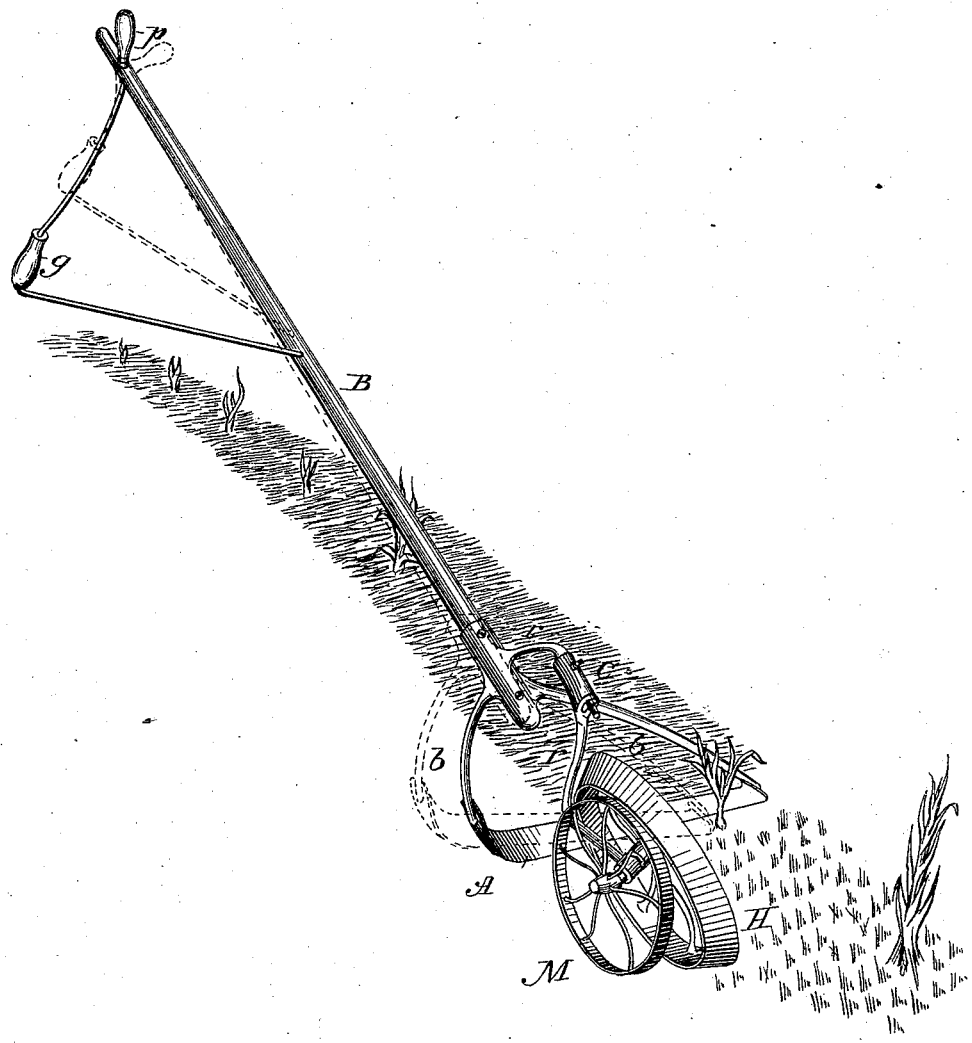
Witnesses.
William Corner.
Richard Corner.
Inventor:
Judson B. Hurd.

UNITED STATES PATENT OFFICE.

JUDSON B. HURD, OF SAN ANTONIO, TEXAS.

HOEING-MACHINE.

SPECIFICATION forming part of Letters Patent No. 373,022, dated November 8, 1887.

Application filed July 25, 1887. Serial No. 245,278. (No model.)

*To all whom it may concern:*

Be it known that I, JUDSON B. HURD, a citizen of the United States, residing at San Antonio, in the county of Bexar and State of Texas, have invented a new and useful Hoeing-Machine, of which the following is a specification.

My invention relates to improvements in hoeing-machines, wheel hoes, cotton choppers, cultivators, &c., whether for hand or horse power, in which the hoeing-blade is moved from right to left to cut between the plants or thin out the plants in the row; and the objects of my improvements are, first, to provide a joint between the handle and the gage-wheel, and to insure such arrangement of parts as will enable the operator, by raising and lowering one hand, to give the blade an oscillating motion or swing it from right to left with the greatest ease, and without tipping or turning the wheel or changing too much the position of the blade in respect to the surface of the ground; second, to provide a double gage-wheel that will have all the advantages of a leaning gage-wheel and will also stand firmly by itself. I avoid also the necessity of having a wheel or other support on each side of the row, and it allows the operator to walk between the rows instead of astride of one. I attain these objects by the mechanism illustrated in the accompanying drawing, in which the figure is a perspective of the machine.

The hoeing-blade A is rigidly fixed to the handle B by means of the two standards $b$ $b$. The double gage-wheel, which consists of the leaning wheel H and the support-wheel M, is connected with the handle B by the crooked rod $r$ $r$, in which there is a loose joint, C, which allows the handle to turn enough for the point of the blade to pass around a plant.

When the left hand is at rest and the right hand is moved up and down, a line from the left-hand piece $p$ to the joint C forms the axis of oscillation for the hoeing-blade A, and is also the axis of revolution for the right-hand piece $g$, and the hoeing-blade is swung from right to left to cut out and in between the plants in the row by means of this upward and downward motion of the right hand. The blade can also be held firmly at any position desired.

The double gage-wheel is an improvement on the leaning gage-wheel employed by me heretofore; and the improvement consists in combining with the leaning wheel H the small support-wheel M in the manner shown, so as to make the whole self-supporting, and to give the use of the joint C, which could not be used to advantage with a single wheel.

I am aware that prior to my invention machines have been made with blades to move from right to left to cut between the hills in the row; but this motion has not been produced by an upward and downward motion of one hand while the other hand is left to regulate the depth of cut, &c., but has been brought about by other means very awkward and unsatisfactory.

I therefore claim as my invention and desire to secure by Letters Patent—

1. The combination, in a hoeing-machine, of a handle having fixed to it an oscillating blade arranged substantially as set forth, the axis of oscillation of the blade passing through one hand-place and forming also the axis of revolution for the other.

2. In a hoeing-machine, the combination of the leaning gage-wheel H with the support-wheel M, substantially as described and shown, and for the purposes specified.

3. In a hoeing-machine, the crooked shank or connecting-rod $r$ $r$, having the joint C, with its axis of motion ranging toward one hand-place, $f$, for the purpose specified.

JUDSON B. HURD.

Witnesses:
L. WM. MENGER,
WILLIAM CAMPBELL.